(12) United States Patent
Watson et al.

(10) Patent No.: US 11,921,757 B2
(45) Date of Patent: Mar. 5, 2024

(54) SYSTEM TO LABEL K-MEANS CLUSTERS WITH HUMAN UNDERSTANDABLE LABELS

(71) Applicant: Capital One Services, LLC, McLean, VA (US)

(72) Inventors: Mark Watson, Urbana, IL (US); Reza Farivar, Champaign, IL (US); Austin Walters, Savoy, IL (US); Jeremy Goodsitt, Champaign, IL (US); Vincent Pham, Champaign, IL (US); Anh Truong, Champaign, IL (US); Galen Rafferty, Mahomet, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/097,524

(22) Filed: Jan. 17, 2023

(65) Prior Publication Data
US 2023/0153330 A1 May 18, 2023

Related U.S. Application Data

(63) Continuation of application No. 15/931,233, filed on May 13, 2020, now Pat. No. 11,556,564.

(51) Int. Cl.
*G06F 7/00* (2006.01)
*G06F 7/08* (2006.01)
*G06F 16/28* (2019.01)
*G06N 5/04* (2023.01)
*G06N 20/00* (2019.01)

(52) U.S. Cl.
CPC .............. *G06F 16/285* (2019.01); *G06F 7/08* (2013.01); *G06N 5/04* (2013.01); *G06N 20/00* (2019.01)

(58) Field of Classification Search
CPC ......... G06F 16/285; G06F 7/08; G06N 20/00; G06N 5/04
USPC ................................................... 707/600–899
See application file for complete search history.

(56) References Cited

U.S. PATENT DOCUMENTS

| | | |
|---|---|---|
| 9,483,768 B2 | 11/2016 | Singh |
| 10,013,679 B1 | 7/2018 | Lewis et al. |
| 11,556,564 B2 | 1/2023 | Watson et al. |
| 2004/0019601 A1 | 1/2004 | Gates |
| 2015/0334458 A1 | 11/2015 | Srinivasan et al. |

(Continued)

*Primary Examiner* — Isaac M Woo
(74) *Attorney, Agent, or Firm* — Sterne, Kessler, Goldstein & Fox P.L.L.C.

(57) ABSTRACT

Disclosed herein are system, method, and apparatus for generating labels for k-means clusters. The method includes accessing a plurality of data records from a database repository, and storing the plurality of data records into at least one of primary or secondary memory associated with at least one computer processor performing the method, along with a cluster number for each data record. All data records having a same cluster number form a cluster, and each record has been categorized or designated a cluster number out of a total K number of clusters. The method includes for each of a plurality of classification features, performing cluster-based analysis for a first cluster with respect to a single feature to generate a single feature overlap score. The method includes sorting, grouping, and generating a naming label for the first cluster based on the predetermined number of features having the lowest overlap scores.

18 Claims, 5 Drawing Sheets

(56) References Cited

U.S. PATENT DOCUMENTS

| | | |
|---|---|---|
| 2018/0240243 A1 | 8/2018 | Kim et al. |
| 2019/0205376 A1 | 7/2019 | Merhav et al. |
| 2021/0004583 A1* | 1/2021 | Evans ................. G06F 16/9014 |

* cited by examiner

SYSTEM TO LABEL K-MEANS CLUSTERS WITH HUMAN UNDERSTANDABLE LABELS

CROSS-REFERENCE TO RELATED APPLICATIONS

This application is a continuation of application Ser. No. 15/931,233, filed May 13, 2020, the disclosure of which is incorporated by reference herein in its entirety.

BACKGROUND

This application is a continuation of application Ser. No. 15/931,233, filed May 13, 2020. One of the known unsupervised machine-learning techniques is K-means clustering, in which similar data points are grouped into a fixed number, for example, k number of clusters. Data points in a cluster have similarities with the other data points in the same cluster. In the K-means clustering process, the first group of centroids is randomly selected, and then each data point is categorized to its closest mean, and the mean's coordinates are updated. This process of calculating its closest means and updating the mean's coordinates are repeated for a predetermined number of iterations. At the end of the iterative process, the clusters and their member data points are identified. However, due to the "black box" nature of the unsupervised machine-learning technique, it is not known why various data points are clustered together. In other words, it is not known what attribute of the data point brought the data point into the cluster, or what the similarity is between various data points in a cluster.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Various embodiments of this disclosure will be discussed with respect to the corresponding figures.

Figure 1:
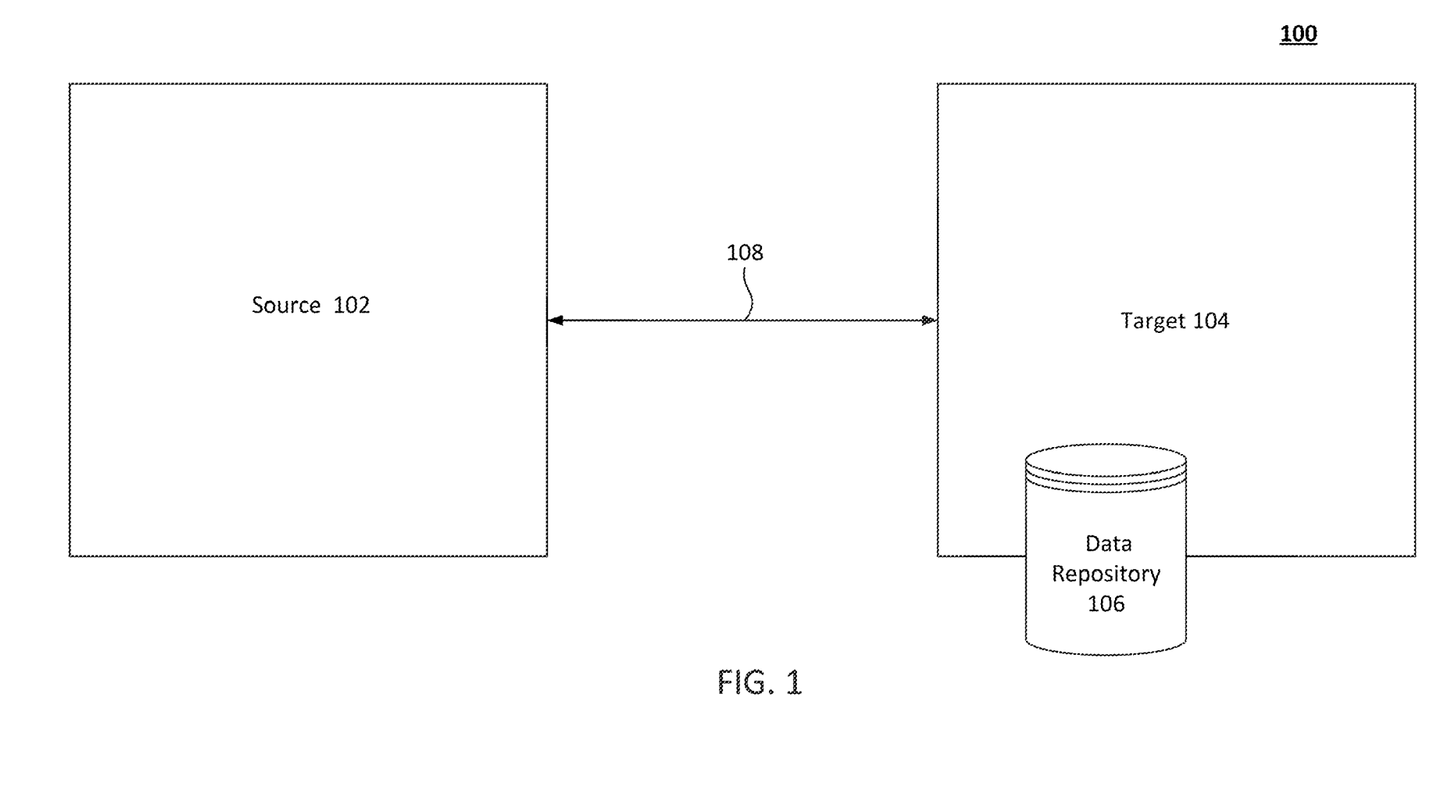
FIG. 1 illustrates an example environment, according to some embodiments.

FIG. 1 illustrates an example environment 100, in which various embodiments described in this disclosure may be practiced. In FIG. 1, a source 102 and a target 104 are shown communicatively coupled to each other via an interface 108. The source 102 and/or the target 104 may be, for example, at least one computer processor, an application server, an application running on the the at least one computer processor and/or the application server. The source 102 and the target may be within the same network, or the source 102 and/or the target 104 may be in one or more cloud networks.

The target 104 also includes a data repository 106, which stores a plurality of data records. The data repository 106 may be, for example, one or more big databases such as Apache Cassandra, CouchDB, and/or Apache HBase developed by Apache Software Foundation, MongoDB developed by MongoDB, Inc., OrientDB developed by OrientDB, Ltd., etc. The data repository 106 may be a PostgreSQL, Oracle, or SQLite database. The data repository 106 may be a data repository, for example, to store large quantities of data (also referred to as "big data") for a financial institution, a pharmaceutical company, a government agency, etc. Thus, the data repository 106 may be maintained by a financial institution, a pharmaceutical company, a government agency, etc. The source 102 and the target 104 each may include one or more central processing units (CPUs). The source 102 may access the plurality of data records stored in the data repository via the interface 108. By way of a non-limiting example, the interface may be a database abstraction layer that provides communication between the source 102 and the data repository 106.

By way of a non-limiting example, the data repository 106 may store a plurality of data records. Each data record of the plurality of data records may be processed through k-means clustering to assign each data record to its associated cluster. Each data record may be a d-dimensional real vector. In k-means clustering, the plurality of data records stored in the data repository 106 is partitioned into k number of sets $S=\{S_1, S_2, S_3 \ldots S_k\}$ to minimize the variance within the cluster, where k<=n and n represents a total number of data records in the data repository 106. The k-means clustering of the plurality of data records may be performed automatically by the target 104 using, for example, Weka, which is an open-source machine learning software in Java for data mining, or scikit-learn, which is a machine learning library that offers tools for data mining and data analysis using the Python programming language, etc. Accordingly, each data record in the data repository 106 may include a cluster number to which the data record belongs. By way of a non-limiting example, the cluster number of the data record may be stored in metadata of the data record.

Figure 2:
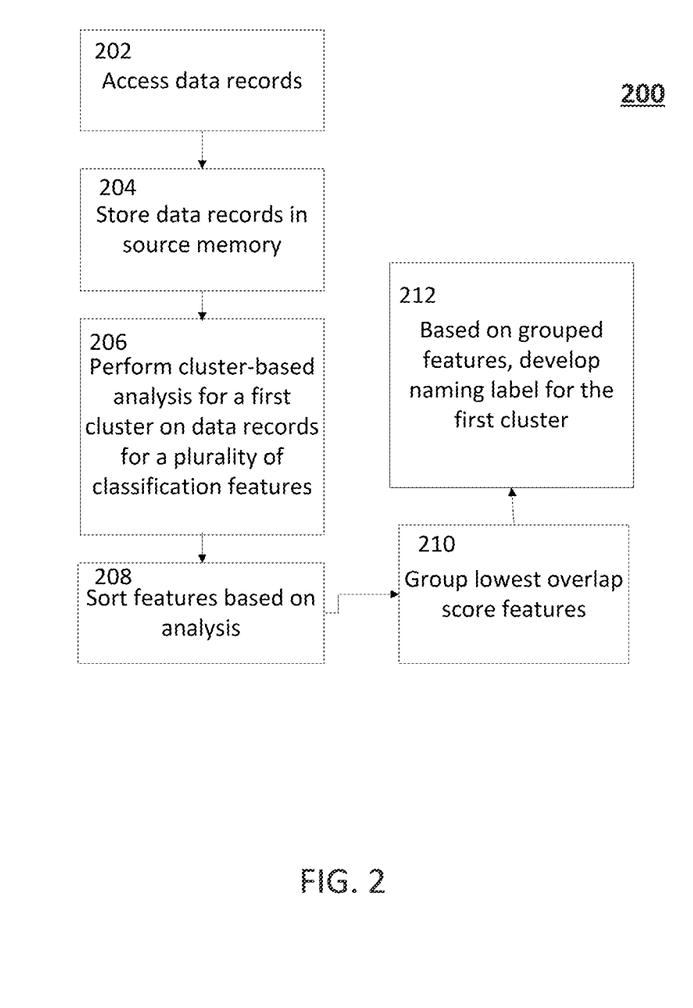
FIG. 2 is a flowchart illustrating a method for generating labels for k-means clusters, according to some embodiments.

FIG. 2 illustrates an example flowchart and its method steps, in accordance with some embodiments. The flowchart 200 begins at step 202, at which at least one processor of the source 102 accesses the plurality of data records from the data repository 106 of the target 104. The plurality of data records may be accessed via the interface 108. By way of a non-limiting example, the source 102 may specify criteria for the plurality of data records, such as data records updated during a certain time period or data records added to the data repository 106 after a specified date and/or time.

At step 204, the at least one processor of the source 102 may store the plurality of data records retrieved from the data repository 106 into a memory of the source 102. The memory of the source 102 may be internal. The internal memory may be either primary or secondary memory in the form of random access memory (RAM), a hard-disk, etc. As described above, each data record of the plurality of data records is assigned a cluster based on its closeness to the centroid of the cluster.

At step 206, for each of a plurality of classification features, a cluster-based analysis may be performed by at least one processor of the source 102 for a first cluster with respect to a single feature. As described above, each data record may be a d-dimensional real vector, where each dimension corresponds to a feature. For example, a data point representing a bank account may include features such as an age of the account holder, gender of the account holder, race or ethnicity of the account holder, account balance, and/or profession of the account holder, etc. Each feature is a dimension. Accordingly, each data point is the d-dimensional record.

At step 206, data points in the first cluster are compared with other data points in other clusters with respect to each feature. By way of a non-limiting example, the proximity of records between different clusters and overlap with the first cluster with reference to a single feature may be determined. In other words, values of the plurality of data points of the first cluster and other clusters for a single feature, for example, the age of the account holder, may be compared. By way of a non-limiting example, based on the comparison, it may be determined that the ages of the account holders for the plurality of data points of the first cluster all vary between ages 18 to 25. In contrast, in this example, the ages of the account holders for the data points of the other clusters all vary between ages 26 to 86. Accordingly, a distinctive feature of the first cluster is that the age of all or majority of account holders in the first cluster is under 25. As such, this distinctive feature of the first cluster (the specific age range) is to be considered in the naming of the first cluster.

In some embodiments and by way of non-limiting example, the comparison of step 206 may include calculating an average and standard deviation for all data points of the first cluster with reference to the single feature, for example, the age of the account holder. Similarly, an average for the same feature (e.g., the age of the account holder) for all data points in other clusters may also be calculated. Subsequently, for all of the other clusters and for the same feature, a distance from an average corresponding to all the data points in the cluster to the average of the first cluster may be determined in terms of the standard deviation of the first cluster. Similarly, proximity to and overlap with the first cluster for each of the other clusters with respect to the same feature (e.g., age of the account holder) may be determined based on the distance between the average corresponding to the first cluster and the average corresponding to each of the other clusters. The overlap with the first cluster may be represented by an overlap score. The lower value of the overlap score may suggest that the data points in the first cluster have a value, with reference to the single feature, that is more unique or in a different set compared to other data points in the other clusters.

In some embodiments, the procedure performed and explained with reference to one of the plurality of features of the data point, for example, the age of the account holder, may be repeated for each feature of the plurality of features of the data point.

At step 208, features are sorted based on their analysis. By way of a non-limiting example, sorting may be performed based on the calculated overlap score of the first cluster with the other clusters. Accordingly, at step 210, based on the sorting, a predetermined number of features, for example, two features, for which the overlap score is lowest as compared to other features may be determined. The lowest overlap scores for a corresponding feature indicates the uniqueness of the data points in the first cluster in comparison to the other clusters and their data points corresponding to the feature. Next, the values of the data points of the first cluster may be analyzed to determine if the values of the data points are above or below a predetermined threshold value.

In some cases, a percentage of data records with their values above or below the predetermined threshold value may also be determined. In other words, an overlap score for a feature may be determined. For example, for the age of the account holder, it may be determined whether all data points in the first cluster have a value of below 21 years, and whether other clusters do not generally have data points corresponding to ages below 21 years. If all data points in the first cluster have the age of the account holder below 21 years, and data points in other clusters generally do not have the age of the account holder below 21 years such that the overlap score with other clusters for this feature is low, then it may be conclusively determined that cluster 1 represents data records corresponding to account holders below 21 years. Similarly, the other feature for which the overlap score is lowest may be the ethnicity of the account holder. Analysis of all data points of the first cluster for the ethnicity of the account holder may identify that the ethnicity corresponds to Asian for the data points in the first cluster. Accordingly, it may be determined that the cluster has characteristics that correspond to account holders below 21 years and of Asian ethnicity, and these characteristics of the cluster can be considered in determining cluster name.

At step 212, based on the conclusive determination made at step 210, the cluster naming label may be developed. The cluster naming label may be developed based on concatenation of partial names corresponding to the features for which the overlap score is lowest, as described above. In some embodiments, for each feature of the data point, a look-up table may describe abbreviations and/or synonyms to be included in the cluster naming label. Additionally, a rating or a preference score may also be assigned to each abbreviation and/or synonym. In some embodiments, the cluster naming label may have a limit on the number of characters in the cluster naming label. Accordingly, if the cluster naming label exceeds the number-of-characters limit, then the abbreviations and/or synonyms from the lowest order of the rating or the preference score may be removed to bring the cluster naming label within the limits of the number of characters. For example, for the cluster that corresponds to account holders below 21 years and of Asian ethnicity, it may be preferred that the cluster be named Age-below-21-years-and-Asian-Ethnicity. However, for example, if the cluster name is limited to 10 characters, the cluster may be named as <21 yrs-Azn based on the preference score for various terms in the lookup table. The lookup table may, for example, suggest "<" for the phrase "below" or "Below," "yrs" for the phrase "years," and "Azn" for the phrase "Asian." In cases where there are more than just two features that could be used as descriptors in the cluster name, some features may be left out of the name based on the rating or preference score. For example, the phrase "Age" and/or "Ethnicity" may have a low preference score in comparison to other phrases in the cluster name and thereby result in the removal of "Age" and "Ethnicity" phrases from the cluster name. By way of a non-limiting example, because multiple clusters may have similar terms used in cluster names, it is important to use the most descriptive terms in only the most relevant clusters.

Figure 3:
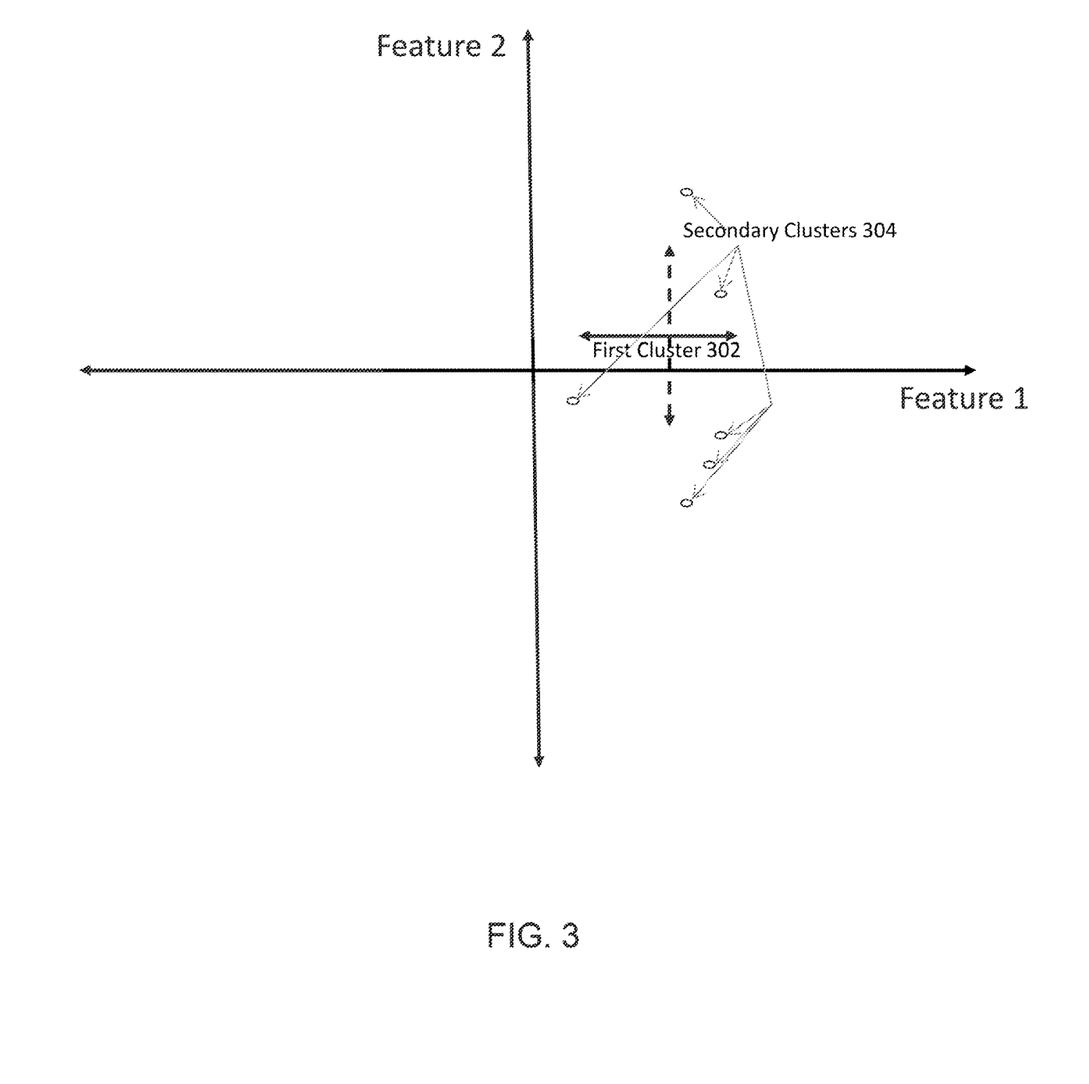
FIG. 3 represents an axis-based analysis of the clusters, in accordance with some embodiments.

In some embodiments, an analysis may be performed for each feature, i.e., a dimension of the data record, by identifying how many clusters have their data records on the same dimension. FIG. 3 represents an axis-based analysis of the clusters, in accordance with some embodiments. Even though each data record is d-dimensional where the value of d can be more than two, FIG. 3 assumes a 2-dimensional data record for explaining how clusters can be analyzed based on the axis of the d-dimensional data records. For a 2-dimensional data record, a Feature 1 may be represented as the X-axis and a Feature 2 may be represented as the Y-axis. Accordingly, data points in a first cluster 302 may have all the data points of the first cluster 302 mainly on the X-axis. And, other clusters, such as secondary cluster 304, may have their data points along the Y-axis. In other words, it may be determined that on the X-axis, data points of a cluster, for example, cluster 1, are present, but on the Y-axis, data points of cluster 2 and cluster 3 are present. Thus, it may be determined that data points in cluster 1 all correspond to a feature represented by the X-axis. Similarly, for each axis, a cluster may be identified that is unique to that axis. The axis and its corresponding feature, therefore, may be considered in the naming label of the cluster.

Figure 4:
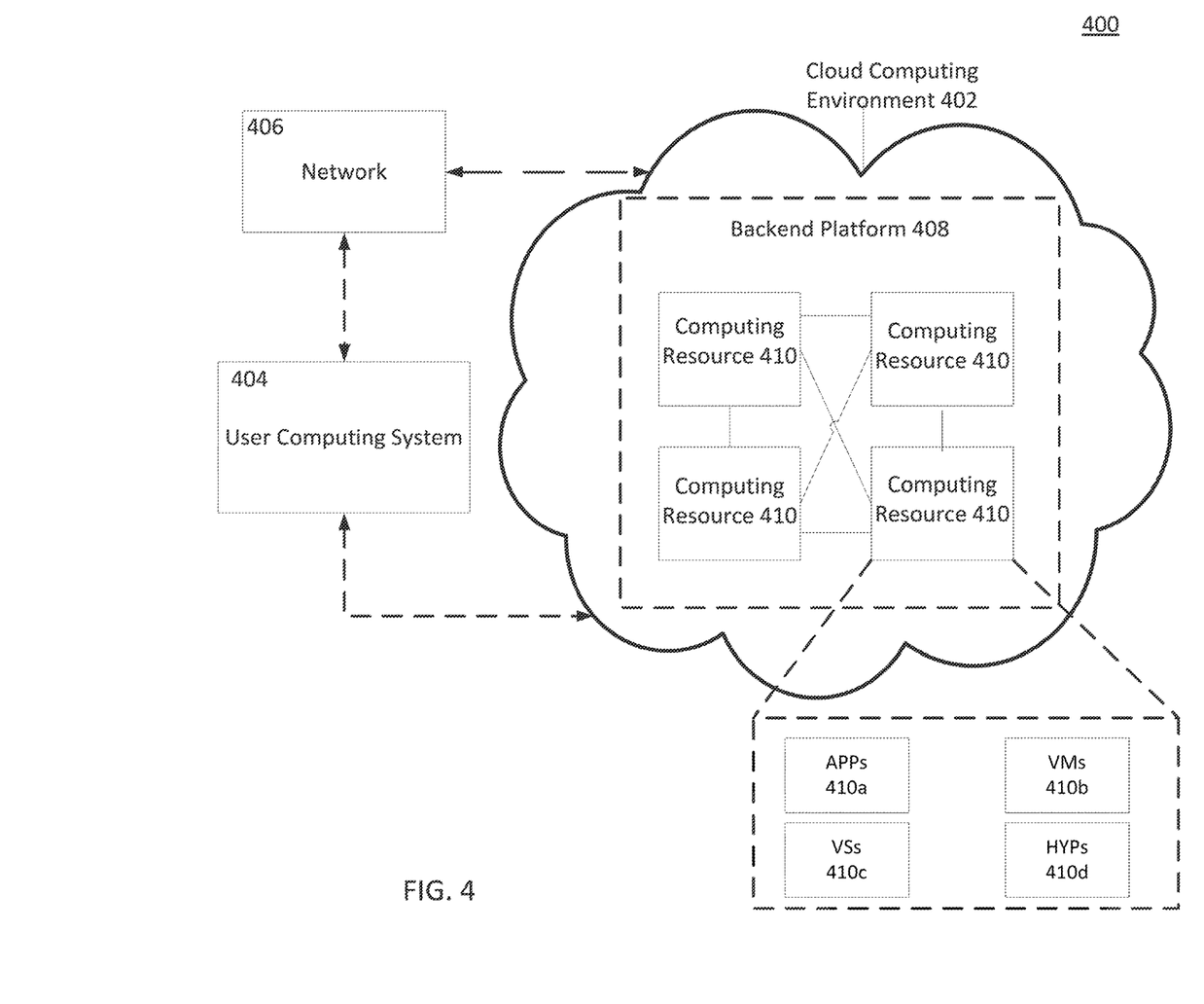
FIG. 4 is a system diagram of an example network in accordance with some embodiments.

FIG. 4 is a system diagram of an example network in accordance with some embodiments. As shown in FIG. 4, a system 400 includes a cloud computing environment 402, a user computing system 404, and a network 406. The cloud computing environment 402 may correspond to the source 102 and/or the target 104. Similarly, the user computing system 404 may correspond to the source 102 and/or the target 104, and the network 406 may provide the interface 108 coupling the source 102 and the target 104. The cloud computing environment 402 may include a backend platform 408, which may include one or more computing resources 410s. The one or more computing resources 410s may be available on-demand to perform one or more computing tasks received from the user computing system 404. The user computing system 404 may communicate with the backend platform 408 via the network 406. By way of a non-limiting example, the network 406 may be a local area network (LAN), a wide area network (WAN), 3G, 4G, 5G, 6G, wireless/wireline network, etc. The network 406 may be a secured network and may be accessed via IPSec tunneling or over a virtual private network. A user of the user computing system 404 may be authenticated prior to access to the backend platform 408. Each computing resource 410 may simulate one or more virtual machines 410b and/or one or more virtual systems 410c. Each computing resource 410 may also include Each computing resource 410 may include one or more personal computers, workstations, computers, server devices, or other types of computation and/or communication devices comprising primary and/or secondary memory, such as that of computing system 500. The computing resource(s) 410 may host the backend platform 408. The cloud computing resources may include computing instances executing in the cloud computing resources 410. The cloud computing resources 410 may communicate with other cloud computing resources 410 via wired connections, wireless connections, or a combination of wired or wireless connections.

Computing resources 410 may include a group of cloud resources, such as one or more applications ("APPs") 410a, one or more virtual machines ("VMs") 410b, virtualized storage ("VS") 410c, and one or more hypervisors ("HYPs") 410d.

An application 410a may include one or more software applications or programs that may be provided to or accessed by a computer system, such as web-based applications, web-based executables, web-based IDEs, etc. The application 410a may include software associated with backend platform 408 and/or any other software configured to be provided across the cloud computing environment 402. The application 410a may send/receive information from one or more other applications 410a, via one or more of the virtual machines 410b. Computing resources 410 may be able to access each other's applications 410a through virtual machines 410b, in this manner. The cloud computing environment 402, hosted and executed by computing resources 410, may communicate with the user-facing applications via the network 406, using any of the various communication protocols and/or secure interfaces mentioned above.

Virtual machine 410b may include a software implementation of a machine (e.g., a computer) that executes programs like a physical machine. Virtual machine 410b may be either a system virtual machine or a process virtual machine. A system virtual machine may provide a complete system platform that supports the execution of a complete operating system (OS). A process virtual machine may execute a single program and may support a single process. The virtual machine 410b may execute on behalf of a user (e.g., the administrator of the multi-lender architecture) and/or on behalf of one or more other backend platforms 408, and may manage the infrastructure of the cloud computing environment 402, such as data management, synchronization, or long-duration data transfers.

Virtualized storage 410c may include one or more storage systems and/or one or more devices that use virtualization techniques within the storage systems or devices of computing resource 410. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the architecture flexibility in how they manage storage for data from the processing of data, and aid in hosting processing micro-services for various lenders, etc. File virtualization may eliminate dependencies between data accessed at a file-level and location where files are physically stored. This manner of a block and file virtualization may enable optimization of storage use, server consolidation, and/or performance of non-disruptive file migrations.

Hypervisor 410d may provide hardware virtualization techniques that allow multiple operations systems (e.g., "guest operating systems") to execute concurrently on a host computer, such as computing resource 410, which may include a computing system such as a server or personal computer, and can in this manner host a virtualized hardware of a user computing system. Hypervisor 410d may present a virtual operating platform to the guest operating systems. It may manage multiple instances of a variety of operating systems as these "guest operating systems," which may share virtualized hardware resources, such as RAM, which may, for instance, access the data in the form of a database of any of the repositories mentioned above. Alternatively, secondary memory may be accessed using virtualized storage 410c, or on physical storage, such as a hard disk drive of a computing resource 410 of the type of computing system as a server, personal computer, etc. In embodiments heretofore described, using a combination of RAM and secondary memory to access the database, such that a portion of the database may be in-memory and a portion of the database stored in files, may also be used.

Figure 5:
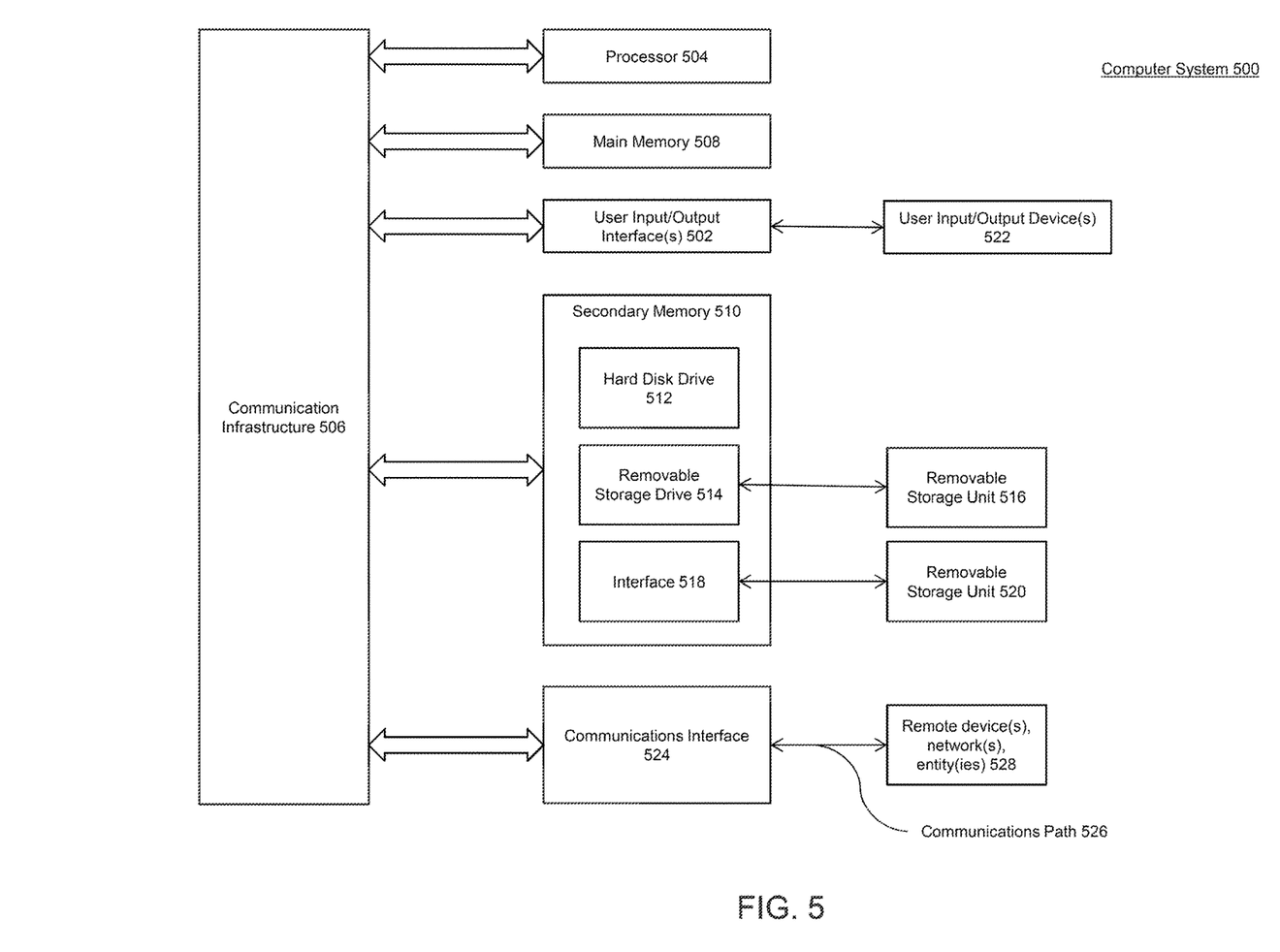
FIG. 5 illustrates an example computer system, according to some embodiments.

FIG. 5 illustrates an example computer system in accordance with some embodiments.

Various embodiments may be implemented, for example, using one or more well-known computer systems, such as a computer system 500, as shown in FIG. 5. One or more computer systems 500 may be used, for example, to implement any of the embodiments discussed herein, as well as combinations and sub-combinations thereof. The computer systems 500 may be used for the implementation of one or more embodiments described above.

The computer system 500 may include one or more processors (also called central processing units, or CPUs), such as a processor 504. The processor 504 may be connected to a communication infrastructure or bus 506.

The computer system 500 may also include user input/output device(s) 503, such as monitors, keyboards, pointing devices, etc., which may communicate with communication infrastructure 506 through user input/output interface(s) 502.

One or more processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 500 may also include a main or primary memory 508, such as random access memory (RAM). Main memory 508 may include one or more levels of cache. Main memory 508 may have stored therein control logic (i.e., computer software) and/or data.

The computer system 500 may also include one or more secondary storage devices or memory 510. The secondary memory 510 may include, for example, a hard disk drive 512 and/or a removable storage device or drive 514. The removable storage drive 514 may be a floppy disk drive, a magnetic tape drive, a compact disk drive, an optical storage device, tape backup device, and/or any other storage device or storage drive.

The removable storage drive 514 may interact with a removable storage unit 518. The removable storage unit 518 may include a computer-usable or readable storage device having stored thereon computer software (control logic) and/or data. The removable storage unit 518 may be a floppy disk, magnetic tape, compact disk, DVD, optical storage disk, and/any other computer data storage device. The removable storage drive 514 may read from and/or write to the removable storage unit 518.

The secondary memory 510 may include other means, devices, components, instrumentalities, or other approaches for allowing computer programs and/or other instructions and/or data to be accessed by the computer system 500. Such means, devices, components, instrumentalities, or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 500 may further include a communication or network interface 524. The communication interface 524 may enable the computer system 500 to communicate and interact with any combination of external devices, external networks, external entities, etc. (individually and collectively referenced by reference number 528). For example, the communication interface 524 may allow the computer system 500 to communicate with the external or remote devices 528 over communications path 526, which may be wired and/or wireless (or a combination thereof), and which may include any combination of LANs, WANs, the Internet, etc. Control logic and/or data may be transmitted to and from the computer system 500 via the communication path 526.

The computer system 500 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 500, the main memory 508, the secondary memory 510, and the removable storage units 518 and 522, as well as tangible articles of manufacture embodying any combination of the foregoing. Such control logic, when executed by one or more data processing devices (such as the computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A computer-implemented method, comprising:
    retrieving, by at least one computer processor, a plurality of data records from a database, wherein the plurality of data records have been categorized by an unsupervised machine-learning algorithm, and wherein each data record of the plurality of data records has been designated a cluster number out of a total K number of clusters;
    for each of a plurality of classification features, performing, by the at least one computer processor, a cluster-based analysis for a first cluster in the K number of clusters to determine proximity of data records between different clusters and overlap with the first cluster, with respect to a single feature, the cluster-based analysis comprising:
        determining, by the at least one computer processor, an average and standard deviation, collectively, for all data records forming the first cluster, for the single feature; and
        determining, by the at least one computer processor, an average for all data records in each other cluster in the K number of clusters, for the single feature;
    generating, by the at least one computer processor, based on the cluster-based analysis, a single feature overlap score for each of the plurality of classification features based on a proximity of the first cluster to the other clusters in the K number of clusters and an amount of overlap of the first cluster with the other clusters in the K number of clusters; and
    generating, by the at least one computer processor, a naming label for the first cluster based on a predetermined number of features having lowest overlap scores of the plurality of classification features.

2. The computer-implemented method of claim 1, wherein the cluster-based analysis further comprises:
    determining, by the at least one computer processor, for each of the other clusters with respect to the single feature, a distance from the average of each of the other clusters out of the K number of clusters to the average of the first cluster in terms of the standard deviation of the first cluster; and
    determining, by the at least one computer processor, proximity to and overlap with the first cluster, for each of the other clusters with respect to the single feature, based on the distance.

3. The computer-implemented method of claim 1, wherein the generating of the naming label for the first cluster further comprises:
    assigning a partial name to each of the predetermined number of features having the lowest overlap scores with respect to the first cluster; and
    combining each of the partial names to make a compound naming label for the first cluster.

4. The computer-implemented method of claim 3, wherein the generating of the naming label for the first cluster further comprises:
    using a look-up table of feature name abbreviations and synonyms to canonical names in order to standardize terms used for feature names in assigning a partial name to each of the predetermined number of features having the lowest overlap scores with respect to the first cluster.

5. The computer-implemented method of claim 3, wherein the generating of the naming label for the first cluster further comprises:
    generating a rating for all words eligible for use in the compound naming label for the first cluster;
    assessing a length of the compound naming label for the first cluster to determine if it surpasses a predetermined length; and
    if the compound naming label for the first cluster is determined to surpass the predetermined length,
    removing one or more words from the compound naming label in order of rating from lowest to highest until the compound naming label does not surpass the predetermined length.

6. The computer-implemented method of claim 1, wherein each data record of the plurality of data records is a d-dimensional vector, and
    wherein each dimension corresponds to a classification feature of the plurality of classification features.

7. A system comprising:
    a first cloud computing network with at least one memory device configured to store instructions, and at least one microprocessor coupled to the memory device, the memory device and the at least one microprocessor collectively comprising a first computing resource within the first cloud computing network, the first computing resource further comprising primary memory and secondary memory, where execution of the stored instructions by the at least one microprocessor causes the first cloud computing network to:
    retrieve, by at least one computer processor, a plurality of data records from a database, wherein the plurality of data records have been categorized by an unsupervised machine-learning algorithm, and wherein each data record of the plurality of data records has been designated a cluster number out of a total K number of clusters;
    for each of a plurality of classification features, perform, by the at least one computer processor, a cluster-based analysis for a first cluster in the K number of clusters to determine proximity of data records between different clusters and overlap with the first cluster, with respect to a single feature, the cluster-based analysis comprising:
        determining, by the at least one computer processor, an average and standard deviation, collectively, for all data records forming the first cluster, for the single feature; and
        determining, by the at least one computer processor, an average for all data records in each other cluster in the K number of clusters, for the single feature;
    generate, by the at least one computer processor, based on the cluster-based analysis, a single feature overlap score for each of the plurality of classification features based on a proximity of the first cluster to the other clusters in the K number of clusters and an amount of overlap of the first cluster with the other clusters in the K number of clusters; and
    generate, by the at least one computer processor, a naming label for the first cluster based on a predetermined number of features having lowest overlap scores of the plurality of classification features.

8. The system of claim 7, wherein the cluster-based analysis comprises:
   determining, by the at least one computer processor, for each of the other clusters with respect to the single feature, a distance from the average of each of the other clusters out of the K number of clusters to the average of the first cluster in terms of the standard deviation of the first cluster; and
   determining, by the at least one computer processor, proximity to and overlap with the first cluster, for each of the other clusters with respect to the single feature, based on the distance.

9. The system of claim 7, wherein the instructions to generate the naming label for the first cluster further comprise instructions to:
   assign a partial name to each of the predetermined number of features having the lowest overlap scores with respect to the first cluster; and
   combine each of the partial names to make a compound naming label for the first cluster.

10. The system of claim 9, wherein the instructions to generate the naming label for the first cluster further comprise instructions to:
   use a look-up table of feature name abbreviations and synonyms to canonical names in order to standardize terms used for feature names in assigning a partial name to each of the predetermined number of features having the lowest overlap scores with respect to the first cluster.

11. The system of claim 9, wherein the instructions to generate the naming label for the first cluster further comprise instructions to:
   generate a rating for all words eligible for use in the compound naming label for the first cluster;
   assess a length of the compound naming label for the first cluster to determine if it surpasses a predetermined length; and
   if the compound naming label for the first cluster is determined to surpass the predetermined length, remove one or more words from the compound naming label in order of rating from lowest to highest until the compound naming label does not surpass the predetermined length.

12. The system of claim 7, wherein each data record of the plurality of data records is a d-dimensional vector, and
   wherein each dimension corresponds to a classification feature of the plurality of classification features.

13. A non-transitory computer-readable storage device having instructions stored thereon that, when executed by at least one computing device, cause the at least one computing device to perform operations comprising:
   retrieving, by at least one computer processor, a plurality of data records from a database, wherein the plurality of data records have been categorized by an unsupervised machine-learning algorithm, and wherein each data record of the plurality of data records has been designated a cluster number out of a total K number of clusters;
   for each of a plurality of classification features, performing, by the at least one computer processor, a cluster-based analysis for a first cluster in the K number of clusters to determine proximity of data records between different clusters and overlap with the first cluster, with respect to a single feature, the cluster-based analysis comprising:
      determining, by the at least one computer processor, an average and standard deviation, collectively, for all data records forming the first cluster, for the single feature; and
      determining, by the at least one computer processor, an average for all data records in each other cluster in the K number of clusters, for the single feature;
   generating, by the at least one computer processor, based on the cluster-based analysis, a single feature overlap score for each of the plurality of classification features based on a proximity of the first cluster to the other clusters in the K number of clusters and an amount of overlap of the first cluster with the other clusters in the K number of clusters; and
   generating, by the at least one computer processor, a naming label for the first cluster based on a predetermined number of features having lowest overlap scores of the plurality of classification features.

14. The non-transitory computer-readable storage device of claim 13, wherein the cluster-based analysis further comprises:
   determining, by the at least one computer processor, for each of the other clusters with respect to the single feature, a distance from the average of each of the other clusters out of the K number of clusters to the average of the first cluster in terms of the standard deviation of the first cluster; and
   determining, by the at least one computer processor, proximity to and overlap with the first cluster, for each of the other clusters with respect to the single feature, based on the distance.

15. The non-transitory computer-readable storage device of claim 13, wherein the generating of the naming label for the first cluster further comprises:
   assigning a partial name to each of the predetermined number of features having the lowest overlap scores with respect to the first cluster; and
   combining each of the partial names to make a compound naming label for the first cluster.

16. The non-transitory computer-readable storage device of claim 15, wherein the generating of the naming label for the first cluster further comprises:
   using a look-up table of feature name abbreviations and synonyms to canonical names in order to standardize terms used for feature names in assigning a partial name to each of the predetermined number of features having the lowest overlap scores with respect to the first cluster.

17. The non-transitory computer-readable device of claim 15, wherein the generating of the naming label for the first cluster further comprises:
   generating a rating for all words eligible for use in the compound naming label for the first cluster;
   assessing a length of the compound naming label for the first cluster to determine if it surpasses a predetermined length; and
   if the compound naming label for the first cluster is determined to surpass the predetermined length, removing one or more words from the compound naming label in order of rating from lowest to highest until the compound naming label does not surpass the predetermined length.

18. The non-transitory computer-readable storage device of claim 13, wherein each data record of the plurality of data records is a d-dimensional vector, and wherein each dimension corresponds to a classification feature of the plurality of classification features.

* * * * *